Oct. 19, 1954   W. H. PETERSON   2,692,032
VEHICLE FLOOR CONSTRUCTION
Filed June 29, 1951   3 Sheets-Sheet 1
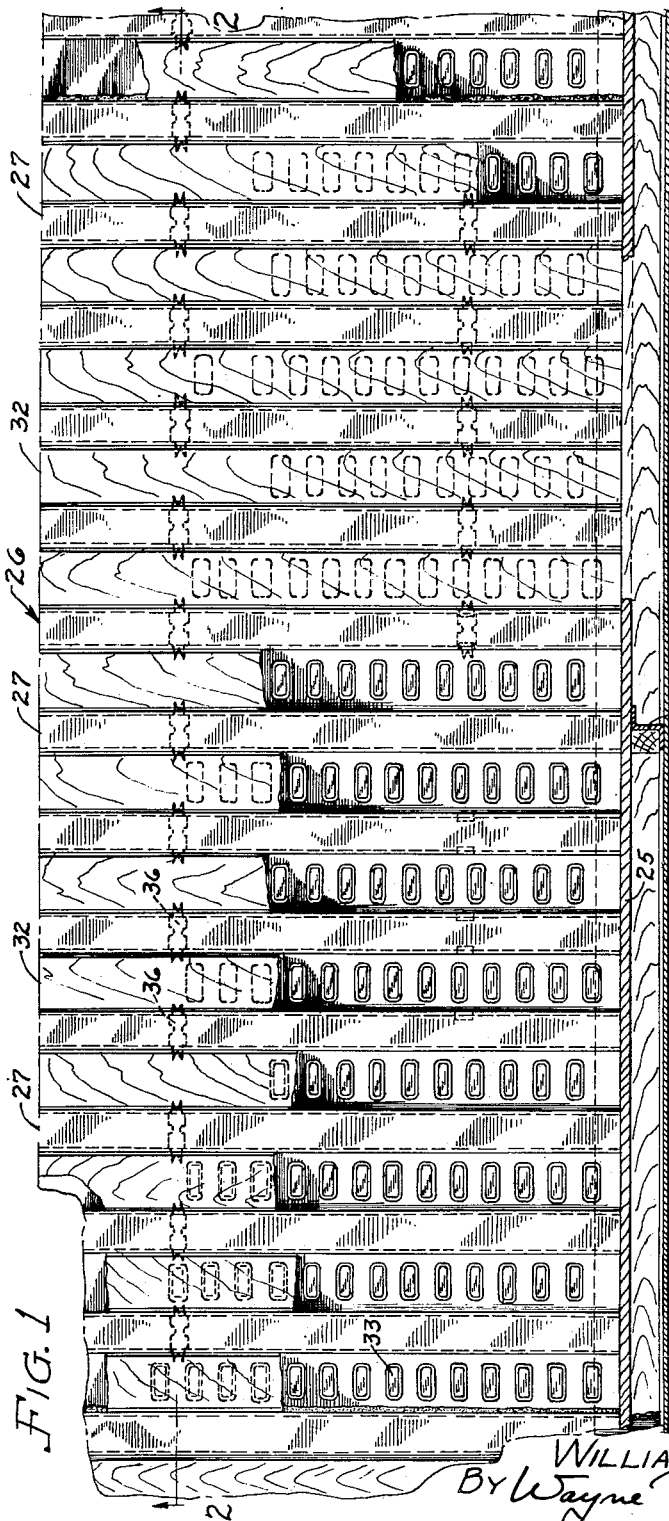
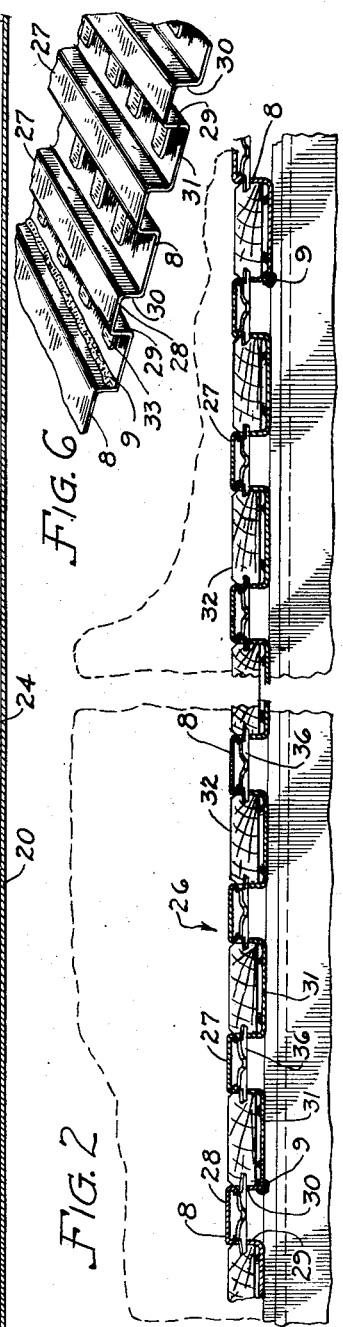
INVENTOR
WILLIAM H. PETERSON
BY Wayne Morris Russell
ATTY.

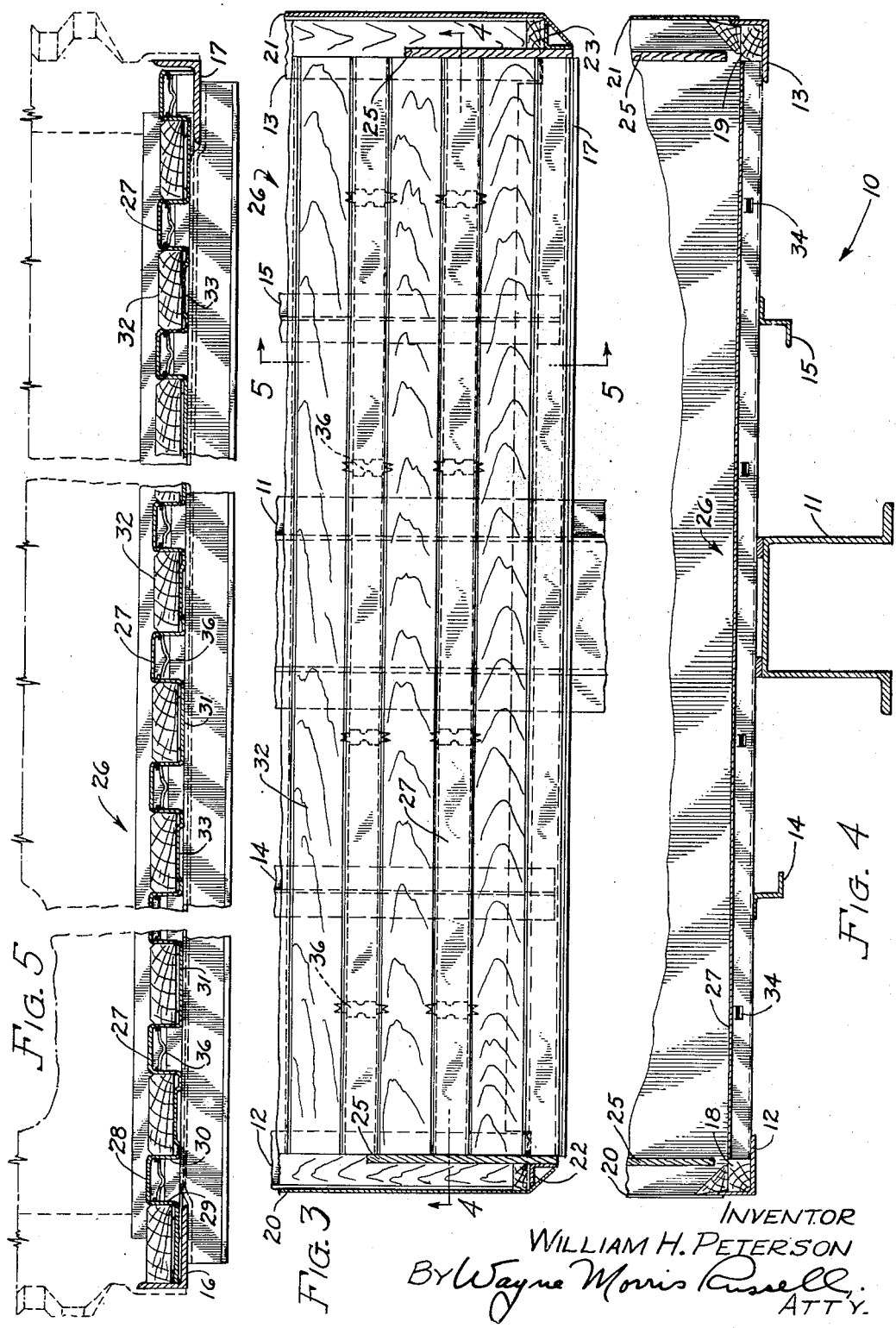

Oct. 19, 1954
W. H. PETERSON
2,692,032
VEHICLE FLOOR CONSTRUCTION
Filed June 29, 1951
3 Sheets-Sheet 3
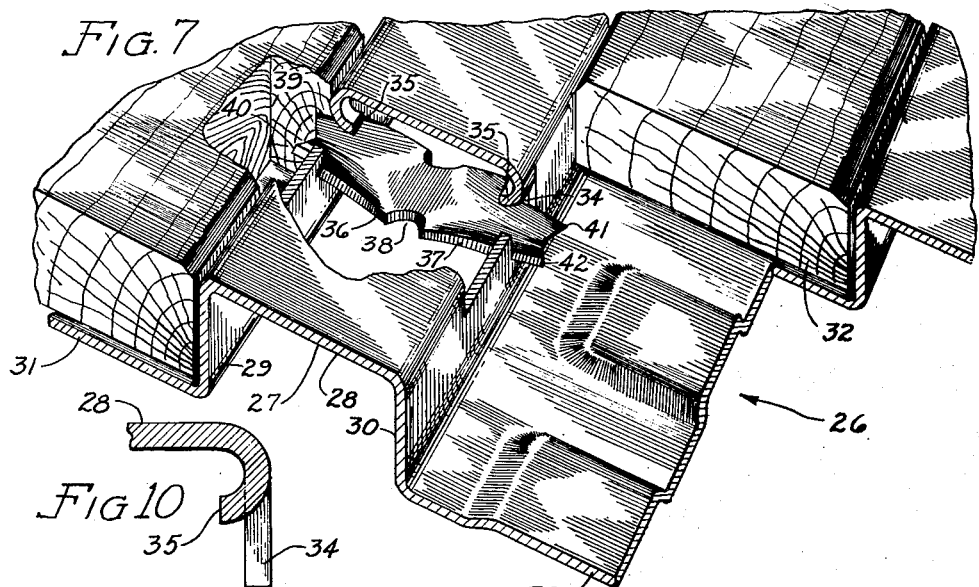
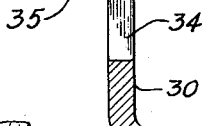
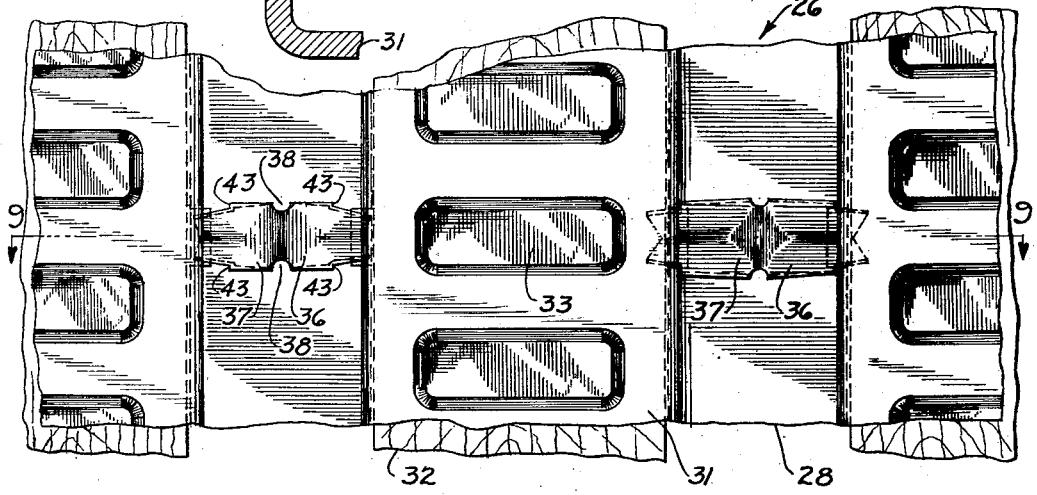
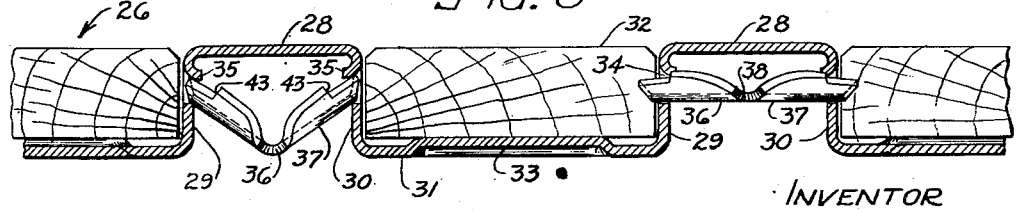
INVENTOR
WILLIAM H. PETERSON
By Wayne Morris Russell
ATT'Y.

Patented Oct. 19, 1954

2,692,032

UNITED STATES PATENT OFFICE 2,692,032

VEHICLE FLOOR CONSTRUCTION

William H. Peterson, Chicago, Ill., assignor to Pullman-Standard Car Manufacturing Company, Chicago, Ill., a corporation of Delaware Application June 29, 1951, Serial No. 234,282

9 Claims. (Cl. 189—34)

This invention relates to vehicle floors and is primarily concerned with a novel means of fastening alternate metal members and wooden boards together in forming the floor of a vehicle.

The principal object of the present invention is to provide a novel means of fastening alternate metal members and wooden boards together in forming the floor of a vehicle.

Another object of the present invention is to provide a structurally novel floor clip for fastening alternate metal members and wooden boards together in forming the floor of a vehicle wherein the ends of the floor clip project through one of the metal members and penetrate into the adjacent wooden boards, with the structure of the floor clip being so formed as to limit the amount that each end of the floor clip penetrates into its adjacent wooden board.

A more specific object of the present invention is to provide a structurally novel floor clip for fastening alternate metal members and wooden boards together in forming the floor of a vehicle wherein the ends of the floor clip project through one of the metal members and penetrate into the adjacent wooden boards, with the structure of the floor clip being so formed as to limit the amount that each end of the floor clip penetrates into its adjacent wooden board, and the structure of the floor clip being so formed that the penetration of one end of the floor clip into its adjacent wooden board is equal to the penetration of the other end of the floor clip into its adjacent wooden board.

A further object of the present invention is to provide a structurally novel floor clip for fastening alternate metal members and wooden boards together in forming the floor of a vehicle wherein the ends of the floor clip project through openings in one of the metal members and penetrate into the adjacent wooden boards, with the openings in the metal member and the structure of the floor clip being so formed that the ends of the floor clip penetrate into the adjacent wooden boards with an angular downward motion as the floor clip is being projected through the openings in one of the metal members and driven into the wooden boards, forcing the boards downwardly into position against the metal members.

The foregoing and other objects of the invention are attained by the construction and arrangement illustrated in the accompanying drawings, wherein Fig. 1 is a fragmentary top plan view of a railway car floor constructed of alternate metal members and wooden boards and showing the structural novel floor clips of the present invention securing the alternate metal members and the wooden boards together, with the wooden boards being broken away to show the small transverse corrugations in the metal members, and showing one of the intermediate posts;

Fig. 2 is a view taken on the line 2—2 of Fig. 1 and looking in the direction of the arrows and showing a broken longitudinal cross section of the railway car floor wherein the structurally novel floor clips of the present invention are shown securing the alternate metal members and the wooden boards together, and showing the locations where the corrugated metal sheets are welded together;

Fig. 3 is a fragmentary top plan view of one end of a railway car floor constructed of alternate metal members and wooden boards and showing the structurally novel floor clips of the present invention securing the alternate metal members and the wooden boards together, and showing the center sill and the longitudinal stringers in broken lines, and showing the wood fillers, corner posts, side walls and wooden lining of a railway freight car;

Fig. 4 is a view taken on the line 4—4 of Fig. 3 and looking in the direction of the arrows and showing one of the metal members and the slots therein, and showing the center sill, side sills, longitudinal stringers, wood fillers, side walls, and wooden lining of a railway freight car;

Fig. 5 is a view taken on the line 5—5 of Fig. 3 and looking in the direction of the arrows and showing a broken longitudinal cross section of the railway car floor wherein the structurally novel floor clips of the present invention are shown securing the alternate metal members and the wooden boards together, and showing the end sills of a railway freight car;

Fig. 6 is a fragmentary perspective view of a corrugated metal section of a railway car floor constructed of alternate metal members and wooden boards and showing the small transverse corrugations in the metal members, and showing the location where the corrugated metal sheets are welded together;

Fig. 7 is a fragmentary perspective view of a railway car floor constructed of alternate metal members and wooden boards and showing the top web and the side walls of one of the metal members broken away, and showing one of the wooden boards broken away, and showing the position of the structurally novel floor clip of the present invention when in fully straightened position wherein it projects through the side walls of one of the metal members and penetrates into the adjacent wooden boards, and showing the lugs on the side walls engaging the structurally novel floor clip when in fully straightened position;

Fig. 8 is a fragmentary bottom view of a railway car floor constructed of alternate metal members and wooden boards and showing the structurally novel floor clip of the present invention securing the alternate metal members and the wooden boards together, and showing the small transverse corrugations in the metal members;

Fig. 9 is a view taken on the line 9—9 of Fig. 8 and looking in the direction of the arrows and showing the structurally novel floor clip of the present invention in bent position between the side walls of one of the metal members ready for penetration into the adjacent wooden boards on the left hand side of the figure, and showing the structurally novel floor clip of the present invention after it has been driven into the adjacent wooden boards and is in fully straightened position on the right hand side of the figure; and Fig. 10 is a fragmentary view of a portion of the top web and one of the side walls of one of the metal members of a railway car floor constructed of alternate metal members and wooden boards and showing one of the slots therein which receives one end of the structurally novel floor clip of the present invention, and showing the lug which projects from the bounding wall of each of the slots.

The invention proposes a novel means of fastening alternate metal members and wooden boards together in forming the floor of a vehicle. The metal members each have a pair of side walls, and the pair of side walls on each metal member are provided with opposed openings. A structurally novel floor clip is adapted to extend between the pair of side walls of one of the metal members and is adapted to be positioned in the opposed openings in the pair of side walls of said one of said metal members. To secure said one of said metal members to the adjacent wooden boards, the structurally novel floor clip is bent at its center and positioned between the pair of side walls on said one of said metal members and the ends of the structurally novel floor clip are inserted in the opposed openings in the pair of side walls of said one of said metal members. The structurally novel floor clip is then struck at its center with any suitable tool, such as a hammer, to straighten it. During the time from going to a bent position to a straightened position, the ends of the floor clip penetrate the adjacent wooden boards with an angular downward motion, forcing the adjacent wooden boards downward against said one of said metal members. Upon structurally novel floor clip attaining a straightened position, certain structure on the floor clip engages the inner faces of the pair of side walls on said metal members and limits the penetration of the ends of the floor clip into the adjacent wooden boards, and said certain structure also insures that the penetration of one end of the floor clip into its adjacent wooden board will be equal to the penetration of the other end of the floor clip into its adjacent wooden board.

In the drawings, 10 generally designates an underframe of a railway box car which includes a center sill 11 extending the full length of the car, a pair of side sills 12 and 13 extending the full length of the car, and a pair of longitudinal stringers 14 and 15 extending the full length of the car, as best shown in Figs. 3 and 4. The side sills 12 and 13 are connected at the ends of the car by end sills 16 and 17. A pair of wood fillers 18 and 19 extend the full length of the car and are superimposed upon the side sills 12 and 13 respectively, and side walls 20 and 21 extend upwardly from the side sills 12 and 13 respectively. Corners posts 22 and 23 are shown in Fig. 3, and intermediate posts 24 are shown in Fig. 1, and wooden linings 25 are secured to the respective posts.

A railway box car floor is generally designated 26, and the floor 26 comprises a plurality of transversely corrugated metal sheets 8 which are arranged in end to end relation with respect to each other and positioned longitudinally of the underframe 10 upon the horizontal flanges of the side sills 12 and 13, and the sheets are welded together at 9 by a continuous weld of the meeting ends across the width of the car so as to provide a corrugated metal floor extending the full length of the car, all as best shown in Figs. 2, 4, and 6. The corrugated metal sheets 8 are welded to the center sill 11, the side sills 12 and 13, and the longitudinal stringers 14 and 15. The corrugated metal sheets 8 comprise a plurality of elongated metal members or corrugations 27 which are arranged in side by side spaced relation with respect to each other. The elongated metal members or corrugations 27 consist of a top web 28 and a pair of spaced depending or vertical connecting or side walls 29 and 30. The side walls 30 and 29 of adjacent elongated metal members 27 of any one of the corrugated metal sheets 8 are integrally secured together by bottom webs 31. The elongated metal members or corrugations 27 are disposed alternately with wooden boards 32 which are supported upon the bottom webs 31 between side walls 30 and 29 on adjacent elongated metal members 27 which are spaced apart the width of the wooden boards 32. The bottom web 31 can be said to consist of two integral flanges, one of the flanges being integral with one side wall of one member and the other of the flanges being integral with the adjacent side wall of the adjacent member. It is to be noted that the top webs 28 are of a smaller width than the bottom webs 31, and because of their smaller width, the top webs 28 are highly resistant to local stresses tending to deflect the web portion downwardly when subjected to concentrated loads at the center of their top surfaces, and the bottom webs 31 are strengthened against similar deflection by the small corrugations 33. The top surfaces of the wooden boards 32 are positioned slightly below the top surfaces of the top webs 28 of the elongated metal members 27 so that when flat objects slide over the surface of the floor 26, most of the resulting abrasion is resisted by the elongated metal members 27.

Each of the side walls 29 and 30 of the elongated metal members or corrugations 27 is provided with a plurality of spaced openings or rectangular-shaped slots 34, and any one of the openings 34 in the side wall 29 of an elongated metal member or corrugation 27 is in alignment with the adjacent or opposed opening 34 in the side wall 30 of the same elongated metal member or corrugation 27. The upper edges of the openings 34 are slit and bent inwards to provide lugs 35 which extend from the bounding walls of the openings 34 in each of the side walls 29 and 30, and the lugs 35 on opposite side walls 29 and 30 of the same elongated metal member 27 project toward each other, as best shown in Figs. 7 and 9. A floor clip 36, fabricated of metal, extends between the pair of side walls 29 and 30 on each of the elongated metal members or corrugations 27 and is positioned in the openings 34 and is adapted to penetrate into the adjacent wooden boards 32 to hold the same in place. Each of the floor clips 36 has its center portion flat and has its remaining portions of a V-shape in transverse cross section, that is, the floor clip 36 has its center portion of a flat cross section, and from the center portion to each end of the floor clip 36, the floor clip 36 is of a V-shape in transverse cross section. The ends of the floor clip 36 are cut away to provide a body or section 37, and the sides of the floor clip 36 are cut away at the center or midway the ends of the section 37 to provide recesses 38. The cut away ends of the floor clip 36 provide a first pair of projections 39 and 40 on one end of the section 37, and the first pair of projections 39 and 40 have the combined dimensions or length or extent of their bases less than the dimension or width of said one end of the section 37. The first pair of projections 39 and 40 are integrally secured together and are positioned on said one end of the section 37 and are integrally secured to the section 37. The cut away ends of the floor clip 36 also provide a second pair of projections 41 and 42 on the other end of the section 37, and the second pair of projections 41 and 42 have the combined dimensions or length or extent of their bases less than the dimension or width of said other end of the section 37. The second pair of projections 41 and 42 are integrally secured together and are positioned on said other end of the section 37 and are integrally secured to the section 37. The first pair of projections 39 and 40 and the second pair of projections 41 and 42 penetrate into the adjacent wooden boards 32, and the ends of the section 37 are of a greater dimension or width than the dimension or size of the openings 34, and the free edges on each of the ends of the section 37 adjacent the sides of the section 37 form shoulders 43 which abut against the inner face of the adjacent side wall 29 or 30.

To apply the floor clip 36, the same is bent at its center at the recesses 38 and the floor clip 36 is positioned between the pair of side walls 29 and 30 of an elongated metal member 27, and one pair of projections, say 39 and 40, are inserted in one of the openings 34 in the side wall 29 of the elongated metal member 27 and the other pair of projections 41 and 42 are sprung into the adjacent or opposed opening 34 in the side wall 30 of the same elongated metal member 27, by striking the floor clip 36 with a light hammer blow, as shown on the left hand side of Fig. 9. Then the floor clip 36 is struck at its center, with a suitable tool such as an air hammer, which causes it to straighten out and to penetrate into the adjacent wooden boards 32, as shown on the right hand side of Fig. 9. As the floor clip 36 is driven straight, the pair of projections 39 and 40 and the pair of projections 41 and 42 pass through the openings 34 and penetrate into the adjacent wooden boards 32 with an angular downward motion, forcing the wooden boards 32 tightly down into position against the bottom webs 31. The lugs 35 act as fulcrums by which the floor clip 36 obtains its angular downward motion while penetrating the wooden boards 32. The shoulders 43 engage the inner faces of the side walls 29 and 30 and limit the amount that the pair of projections 39 and 40 or the pair of projections 41 and 42 can penetrate into the wooden boards 32, and the shoulders 43 also insure that the amount that the pair of projections 39 and 40 penetrate into the adjacent wooden board 32 will be equal to the amount the pair of projections 41 and 42 penetrate into the adjacent wooden board 32. The pair of projections 39 and 40 and the pair of projections 41 and 42 fit snugly into the openings or slots 34, and this snug fitting of the floor clip 36 in the openings or slots 34 supplies resistance against the tendency of the portions of the floor clip 36, which are of a V-shape in transverse cross section, to unfold into a weaker, more flattened section, when in the fully straightened position in one of the elongated metal members 27 and the adjacent wooden boards 32. The lugs 35 serve as a stop to limit the amount of bending while straightening the floor clip 36 during insertion into one of the elongated metal members 27 and penetration into the adjacent wooden boards 32, so that after the floor clip 36 reaches the fully straightened position, further bending toward the adjacent top web 28 becomes difficult. The floor clips 36 may be removed from the wooden boards 32 and the elongated metal members 27 by inserting a suitable tool, such as a pry bar, between the floor clip 36 and the inner face of the top web 28 and prying the floor clip 36 out.

From the foregoing it will be seen that there has been provided a structurally novel floor clip for fastening alternate metal members and wooden boards together wherein the wooden boards adjacent one of the metal members are forced downwardly as the ends of the floor clip are projected through opposed openings in the side walls of said one of said metal members and driven into said adjacent wooden boards, and wherein certain structure on the floor clip limits the penetration of the ends of the floor clip into said adjacent wooden boards and wherein said certain structure also insures that the penetration of one end of the floor clip into one of the said adjacent wooden boards will be equal to the penetration of the other end of the floor clip into the other of said adjacent wooden boards.

What is claimed is:

1. A vehicle floor comprising a plurality of elongated metal members arranged in side by side spaced relation with respect to each other and each of the elongated metal members having a pair of side walls with solid penetrable flooring members alternating between the elongated metal members, each of the side walls of the elongated metal members being provided with an opening and the opening in one side wall of an elongated metal member being in alignment with the opening in the other side wall of the same elongated metal member, and a floor clip extending between the pair of side walls on each of the elongated metal members and positioned in said openings and penetrating into the adjacent solid penetrable flooring members holding the same in place, each of said floor clips having its ends cut away providing a body with a projection on one end of said body having a base of lesser dimension than the dimension of said one end of said body and a projection on the other end of said body having a base of a lesser dimension than the dimension of said other end of said body, said projections penetrating into the adjacent solid penetrable flooring members and the free edges on the ends of said body forming shoulders abutting against the inner face of the adjacent side walls.

2. A vehicle floor comprising a plurality of elongated metal members arranged in side by side spaced relation with respect to each other and each of the elongated metal members having a pair of side walls with solid penetrable flooring members alternating between the elongated metal members, each of the side walls of the elongated metal members being provided with an opening and the opening in one side wall of an elongated metal member being in alignment with the opening in the other side wall of the same elongated metal member, and a floor clip extending between the pair of side walls on each of the elongated metal members and positioned in said openings and penetrating into the adjacent solid penetrable flooring members holding the same in place, each of said floor clips having its center portion flat and having its remaining portions of a V-shape in transverse cross section and the ends of said floor clips being cut away providing a body with a projection on one end of said body having a base of a lesser dimension than the dimension of said one end of said body and a projection on the other end of said body having a base of a lesser dimension than the dimension of said other end of said body, said projections penetrating into the adjacent solid penetrable flooring members and the free edges on the ends of said body forming shoulders abutting against the inner face of the adjacent side wall.

3. A vehicle floor comprising a plurality of elongated metal members arranged in side by side spaced relation with respect to each other and each of the elongated metal members having a pair of side walls and flanges along the side walls with solid penetrable flooring members alternating between the elongated metal members and seated upon the flange, each of the side walls of the elongated metal members being provided with an opening and the opening in one side wall of an elongated metal member being in alignment with the opening in the other side wall of the same elongated metal member, and a floor clip extending between the pair of side walls on each of the elongated metal members and positioned in said openings and penetrating into the adjacent solid penetrable flooring members holding the same in place, each of said floor clips having its center portion flat and having its remaining portions of a V-shape in transverse cross section and the ends of said floor clip being cut away providing a body with a projection on one end of said body having a base of a lesser dimension than the dimension of said one end of said body and a projection on the other end of said body having a base of a lesser dimension than the dimension of said other end of said body, said projections penetrating into the adjacent solid penetrable flooring members with an angular downward motion forcing the boards tightly down against the flanges and the free edges on the ends of said body forming shoulders abutting against the inner face of the adjacent side wall.

4. A vehicle floor comprising a plurality of elongated metal members arranged in side by side spaced relation with respect to each other and each of the elongated metal members having a pair of side walls with solid penetrable flooring members alternating between the elongated metal members, each of the side walls of the elongated metal members being provided with an opening and the opening in one side wall of an elongated metal member being in alignment with the opening in the other side wall of the same elongated metal member, and a floor clip extending between the pair of side walls on each of the elongated metal members and positioned in said openings and penetrating into the adjacent solid penetrable flooring members holding the same in place, each of said floor clips having its ends cut away providing a body with a pair of projections on one end of said body having bases the combined dimensions of which are less than the dimension of said one end of said body and a pair of projections on the other end of said body having bases the combined dimensions of which are less than the dimension of said other end of said body, the first named pair of projections and the second named pair of projections penetrating into the adjacent solid penetrable flooring members and the free edges on the ends of said body adjacent the sides fo said body forming shoulders abutting against the inner face of the adjacent side wall.

5. A vehicle floor comprising a plurality of elongated metal members arranged in side by side spaced relation with respect to each other and each of the elongated metal members having a pair of side walls with solid penetrable flooring members alternating between the elongated metal members, each of the side walls of the elongated metal members being provided with an opening and the opening in one side wall of an elongated metal member being in alignment with the opening in the other side wall of the same elongated metal member, and a floor clip extending between the pair of side walls on each of the elongated metal members and positioned in said openings and penetrating the adjacent solid penetrable flooring members holding the same in place, each of said floor clips having its center portion flat and having its remaining portions of a V-shape in transverse cross section and the ends of said floor clip being cut away providing a body with a pair of projections on one end of said body having bases the combined dimensions of which are less than the dimension of said one end of said body and a pair of projections on the other end of said body having bases the combined dimensions of which are less than the dimension of said other end of said body, the first named pair of projections and the second named pair of projections penetrating into the adjacent solid penetrable flooring member and the free edges on the ends of said body adjacent the sides of said body forming shoulders abutting against the inner face of the adjacent side wall.

6. A vehicle floor comprising a plurality of elongated metal members arranged in side by side spaced relation with respect to each other and each of the elongated metal members being in the shape of a single corrugation having a pair of side walls and a web extending between the side walls with solid penetrable flooring members alternating between the elongated metal members and positioned against the side walls of adjacent members leaving the members as open corrugations, each of the side walls of the elongated metal members being provided with an opening and the opening in one side wall of an elongated metal member being in alignment with the opening in the other side wall of the same elongated metal member, and a floor clip extending between the pair of side walls on each of the elongated metal members and positioned in said openings and penetrating the adjacent solid penetrable flooring members holding the same in place, the floor clips being accessible through the open corrugations, each of said floor clips having its center portion flat and having its remaining portions of a V-shape in transverse cross section and the ends of said floor clip being cut away providing a body with a pair of projections on one end of said body having bases the combined dimensions of which are less than the dimension of said one end of said body and a pair of projections on the other end of said body having bases the combined dimensions of which are less than the dimension of said other end of said body, the first named pair of projections and the second named pair of projections penetrating into the adjacent solid penetrable flooring members and the free edges on the ends of said body adjacent the sides of said body forming shoulders abutting against the inner face of the adjacent side wall.

7. A vehicle floor comprising a corrugated metal sheet with solid penetrable flooring members positioned between the corrugations and supported upon the corrugated metal sheet, each of the corrugations having a pair of spaced side walls and each of the side walls of the corrugations being provided with an opening and the opening in one side wall of a corrugation being in alignment with the opening in the other side wall of the same corrugation, and a floor clip extending between the pair of side walls on each of the corrugations and positioned in said openings and penetrating the adjacent solid penetrable flooring members holding the same in place, each of said floor clips having its ends cut away providing a body and a projection on one end of said body having a base of a lesser dimension than the dimension of said one end of the body and a projection on the other end of said body having a base of a lesser dimension than the dimension of said other end of said body, said projections penetrating into the adjacent solid penetrable flooring members and the free edges on the ends of said body forming shoulders abutting against the inner face of the adjacent side wall.

8. A vehicle floor comprising a plurality of transversely corrugated metal sheets arranged in end to end relation with respect to each other and welded together with solid penetrable flooring members positioned between the corrugations and supported upon the corrugated metal sheets, each of the corrugations having a pair of spaced side walls and each of the side walls of the corrugations being provided with an opening and the opening in one side wall of a corrugation being in alignment with the opening in the other side wall of the same corrugation, and a floor clip extending between the pair of side walls on each of the corrugations and positioned in said openings and penetrating the adjacent solid penetrable flooring members holding the same in place, each of said floor clips having its ends cut away providing a body and a projection on one end of said body having a base of a lesser dimension than the dimension of said one end of said body and a projection on the other end of said body having a base of a lesser dimension than the dimension of said other end of said body, said projections penetrating into the adjacent solid penetrable flooring members and the free edges on the ends of said body forming shoulders abutting against the inner face of the adjacent side wall.

9. A vehicle floor clip comprising a metal plate of greater length than width bent along its transverse center line into two angularly related halves and with each half bent along the outer portion only of its longitudinal center line into two angularly related flat, plane wings, each wing terminating at its outer end in a portion in the plane of the wing of reduced width comprising a pointed projection and each wing having its outer longitudinal edge provided with an abrupt transverse shoulder at the inner end of said portion of reduced width, said shoulder being nearer to the pointed projection than to the transverse center line of the plate and being adapted to seat against the margin of an aperture in a metal member when the clip is inserted between a pair of apertured metal members and is distorted to bend the two halves into longitudinal alignment, whereby such seating of the four shoulders, all disposed in a common plane spaced from and parallel to the plane of the longitudinal center line of the clip, substantially limits bending of the clip beyond longitudinal alignment of the two halves.

References Cited in the file of this patent

UNITED STATES PATENTS

| Number | Name | Date |
|---|---|---|
| 735,540 | Lyon | Aug. 4, 1903 |
| 863,184 | Jaquith | Aug. 13, 1907 |
| 1,558,216 | Bachmann | Oct. 20, 1925 |
| 2,041,946 | Nave | May 26, 1936 |
| 2,056,137 | Idoine | Sept. 29, 1939 |

OTHER REFERENCES

Railway Age, Sept. 16, 1950, pages 61–62.